March 23, 1926.
F. C. LEAVITT
1,577,864
AUXILIARY AUTO SPRING
Filed Jan. 31, 1925
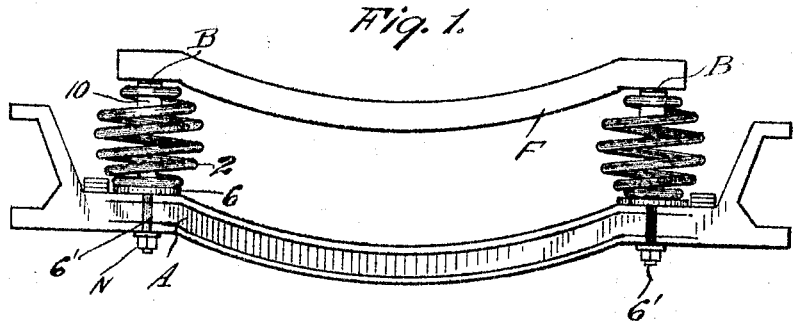
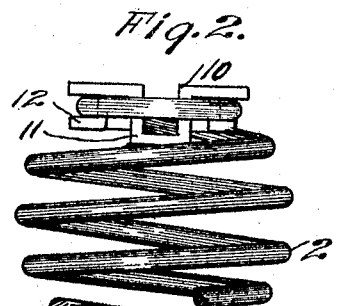
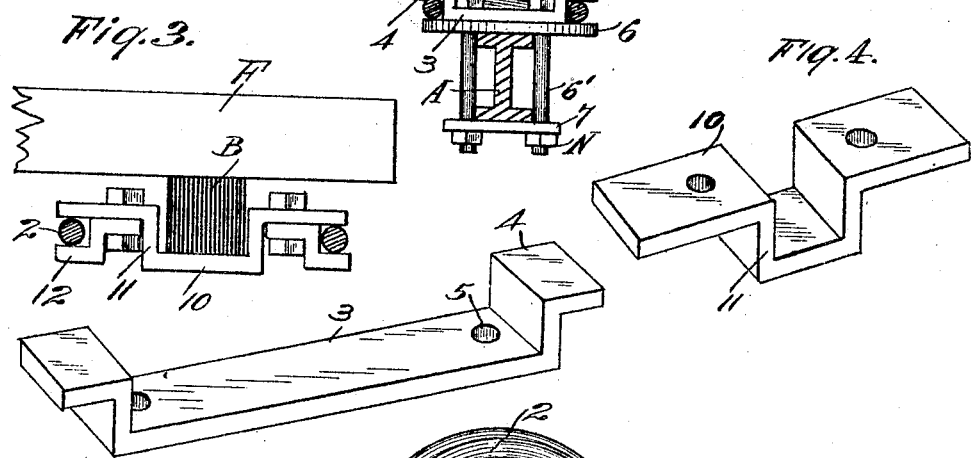
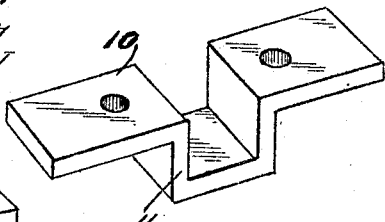
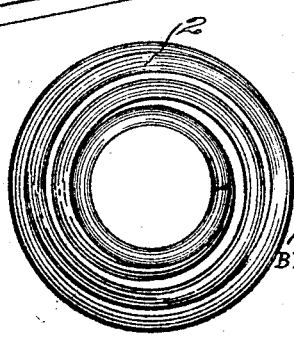
INVENTOR:
Frederick C. Leavitt;
BY G. E. Maynard
ATTORNEY Patented Mar. 23, 1926.

1,577,864

UNITED STATES PATENT OFFICE.

FREDERICK C. LEAVITT, OF LOS ANGELES, CALIFORNIA.

AUXILIARY AUTO SPRING.

Application filed January 31, 1925. Serial No. 6,040.

*To all whom it may concern:*

Be it known that I, FREDERICK C. LEAVITT, a citizen of the United States, and resident of Los Angeles, Los Angeles County, State of California, have invented new and useful Improvements in Auxiliary Auto Springs, of which the following is a specification.

This invention relates to vehicle springs and especially to auxiliary springs.

An object of this invention is to provide a spring which may be readily introduced between a vehicle axle and its frame without in any way changing the usual parts or drilling any special holes for fastening means.

An object is to provide an auxiliary spring which will effectively ease the riding qualities of stock cars and provide an overload support without imparting stiffness of initial action.

Some vehicles of the pleasure type, have a standard spring equipment which permits rather too quick and sharp free motion under reaction of slight surface unevenness and shoulders with the result that the car body bounces too liberally and jolts are often produced when the frame hits the axles.

My invention is designed to provide for absorbing much of the bouncing re-actions without unduly stiffening the support.

This I accomplish by a new and novel balloon-shaped spring adapted to be readily installed as an auxiliary in old and new vehicles.

Other objects and advantages will be made manifest in the following specification of apparatus of one embodiment of the invention here illustrated; it being understood that modifications, variations, and adaptations may be resorted to within the spirit of the invention and its scope as herein claimed.

Figure 1 is a front elevation of the front axle of a Chevrolet automobile combined with the improved auxiliary spring.

Figure 2 is a cross-section showing the auxiliary spring clipped on the axle.

Figure 3 is a detail of the top, spring saddle applied on the usual rubber bumper and showing only the top coil of the auxiliary spring.

Figure 4 is a perspective of the top saddle.

Figure 5 is a perspective of the lower stirrup.

Figure 6 is a plan of the spring.

This illustrated form of the invention comprises a generally spherically wound spring 2 thus presenting in side view a helix and in plan view a spiral winding outline. Thus I am enabled to employ a stout rod of many coils capable of flattening into a narrow space before contact between coils and am enabled use of a long spring rod obtaining long life and soft action of the spring. A cylindrical helix is obviously of limited length of rod for a given space between supports.

Reducing rod diameter to get length and life of course reduces load resistance. Therefore, in cramped spaces the requisite cylindro-helix is excluded. Leaf springs are cumbersome and not readily installed as auxiliaries.

I have successfully employed my spring 2 in combination with a model of Chevrolet cars by clipping a spring on top of the front axle A and retaining the top of the spring in situ by the rubber bumper B usually provided and generally bolted on the lower face of the frame rail F.

I provide means for mounting the spring without removal of or in any manner altering the stock parts which are engaged by the applied spring 2.

The spring at its lower coil is engaged by a double hooked flat cross-bar 3 the offset ends 4 of which overlap and inwardly bear against the bottom coil of the spring. The bar 3 is perforated at 5 to receive bolts 6' drawing it down against a bridge plate or disc 6 on which the lower coil is solidly seated. The coil and the disc 6 may be of about the same diameters.

The plate is designed to rest directly on the top of axle A down the sides of which extend the bolts 6' which receive a cross-tie 7 tightened up by nuts N.

When a set of the springs is to be applied the body of the vehicle is jacked up well so that the springs can be set into position preferably with the top of the springs surrounding the usual rubber bumpers or blocks B fixed on the frame.

For this purpose the top of the spring has a saddle bar 10 bent down at 11 at its central portion to form a seat for the bumper B. Secured on and under the ends of the saddle bar are clamp hooks 12 holding the bar to the top coil of the spring.

By such an arrangement of the top of the spring to react against the rubber bumper elimination of squeaks at this mounting of the spring is entirely accomplished.

The invention, it will be seen, consists of few and simple parts and is free of moving levers and other mechanisms and has no working joints to wear and require lubrication.

Manifestly, the form of top rest and bottom clip may be varied from proper adaptation to different abutments, and any number of the springs may be interposed on the different axles.

What is claimed is:

1. A spherical, coil spring having a stirrup clamped on its lower coil, and a depressed saddle clamped on its upper coil.

2. A spherical, coil spring having a stirrup clamped on its lower coil; and a saddle clamped on its upper coil said saddle having a depressed cross bar to receive and bear on the usual bumper block of a vehicle frame.

3. In combination, a coil spring and a bumper block saddle on its top and including a cross-bar having a depressed, central seat portion for a bumper block, and means for clamping the ends of the bar to the top coil.

4. An auxiliary, automobile spring device comprising a disc, a helical spring having a buttom ring coil resting on the disc, a bar having off-set ends hooked over the said coil and being bolted on the disc, and a top saddle on the top coil of the spring and having a depressed seat portion to receive and thrust against a bumper block.

FREDERICK C. LEAVITT.